US006831751B1

(12) United States Patent
Mori

(10) Patent No.: US 6,831,751 B1
(45) Date of Patent: Dec. 14, 2004

(54) FORMING APPARATUS AND METHOD FOR CONTROLLING THE DOUBLE-SIDE PRINTING TO THE DIFFERENT ORIGINAL SIZES

(75) Inventor: Yujin Mori, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/502,022

(22) Filed: Feb. 11, 2000

(51) Int. Cl.[7] .......................... G06F 3/12; G06F 13/00

(52) U.S. Cl. ..................... 358/1.13; 358/1.14; 358/449

(58) Field of Search .............................. 358/1.13, 1.15, 358/1.14, 1.4, 1.2, 1.17, 501, 505, 449; 355/407, 24, 26; 271/9.06

(56) References Cited

U.S. PATENT DOCUMENTS

| | | | | |
|---|---|---|---|---|
| 4,218,128 A | * | 8/1980 | Satomi et al. | 355/14 |
| 4,978,980 A | | 12/1990 | Noguchi et al. | 346/150 |
| 5,105,230 A | * | 4/1992 | Emori | 355/319 |
| 5,231,516 A | * | 7/1993 | Kamon et al. | 358/451 |

FOREIGN PATENT DOCUMENTS

| | | |
|---|---|---|
| JP | 5-173385 A | 7/1993 |
| JP | 8-223326 A | 8/1996 |
| JP | 8-262933 A | 10/1996 |
| JP | 9-205515 A | 8/1997 |
| JP | 10-301444 A | 11/1998 |

* cited by examiner

*Primary Examiner*—Gabriel Garcia
*Assistant Examiner*—Douglas Tran
(74) *Attorney, Agent, or Firm*—Foley & Lardner LLP

(57) ABSTRACT

When multiple-size double-side printing in an APS mode has been selected, a system CPU first reads an original which corresponds to a second side of a paper sheet, prints data of the original on the second side of the paper sheet having the same size as the original, and stacks the paper sheet on an automatic double-side unit. Subsequently, the system CPU reads an original which corresponds to a first side of the paper sheet and prints data of the original on the first side of the paper sheet stacked on the automatic double-side unit, thus completing the double-side printing. However, where the size of an original corresponding to a second side differs from the size of an original corresponding to a first side, single-side printing is effected. The original corresponding to the first side is read and data thereof is printed on a paper sheet having the same size as the original and the sheet is discharged (single-side printing). Then, the original corresponding to the first side is read and data thereof is printed on a paper sheet having the same size as the original and the sheet is discharged (single-side printing).

43 Claims, 5 Drawing Sheets

FORMING APPARATUS AND METHOD FOR CONTROLLING THE DOUBLE-SIDE PRINTING TO THE DIFFERENT ORIGINAL SIZES

BACKGROUND OF THE INVENTION

The present invention relates to an image forming apparatus and image forming method for forming images on both sides of a paper sheet in a printer unit on the basis of image data acquired by reading originals in a scanner unit.

A program scheme of a conventional image forming apparatus comprises a display control of a control panel, an input control in which the control panel is manually operated and print data is acquired from input data, and a system control section (hereinafter referred to as "system") such as a print control for printing input data.

In a double-side printing operation, the print control first effects printing on a second side of a sheet and stacks it on an automatic double-side unit (ADU). The sheet size at the time of printing is determined by the input control when an original is read. The print control effects printing on a paper sheet which is fed from a sheet cassette in which paper sheets having the sheet size determined by the input control are set.

For printing on a first side, the sheet is fed from the automatic double-side unit. After printing, the sheet is discharged to a tray or a finisher. The sheet size for the first side is the same as the sheet size for the second side on which printing has already been effected.

However, in a multiple-size double-side printing in an automatic paper selector (APS) mode, the sheet size determined by the input control at the time of reading may differ between the second side and the first side, depending on the order of originals. In this case, the following problems will arise:

(1) Where the sheet size for the second side is smaller than the sheet size for the first side, omission of image will occur on the first side.

(2) Where the sheet size for the second side is greater than the sheet size for the first side, a blank portion will form on the first side.

BRIEF SUMMARY OF THE INVENTION

The object of the present invention is to provide an image forming apparatus and an image forming method capable of preventing omission of image or formation of a blank portion in multiple-size double-side printing.

In order to achieve the above object, according to the present invention, there is provided an image forming apparatus comprising: confirmation means for confirming, when an instruction has been made to read a plurality of originals with different original sizes and form read images on first and second sides of a paper sheet, whether or not the original sizes of the originals whose images are to be formed on the first and second sides of the paper sheet are the same;

first control means for performing, when the original sizes are determined to be the same by the confirmation means, a control to form an image on a paper sheet corresponding to the original size of the original for forming an image on the second side on the basis of image data of the original for forming the image on the second side, to form an image on an image formation surface of the paper sheet on the basis of image data of the original for forming an image on the first side, and to discharge the paper sheet; and second control means for performing, when the original sizes are determined to be different by the confirmation means, a control to form an image on a paper sheet corresponding to the original size of the original for forming an image on the first side on the basis of image data of the original for forming the image on the first side, to discharge the paper sheet, to form an image on a paper sheet corresponding to the original size of the original for forming an image on the second side on the basis of image data of the original for forming the image on the second side, and to discharge this paper sheet.

According to the present invention, there is also provided an image forming method comprising: a first step of confirming, when an instruction has been made to read a plurality of originals with different original sizes and form read images on first and second sides of a paper sheet, whether or not the original sizes of the originals whose images are to be formed on the first and second sides of the paper sheet are the same; a second step of performing, when the original sizes are determined to be the same in the first step, a control to form an image on a paper sheet corresponding to the original size of the original for forming an image on the second side on the basis of image data of the original for forming the image on the second side, to form an image on an image formation surface of the paper sheet on the basis of image data of the original for forming an image on the first side, and to discharge the paper sheet; and a third step of performing, when the original sizes are determined to be different in the first step, a control to form an image on a paper sheet corresponding to the original size of the original for forming an image on the first side on the basis of image data of the original for forming the image on the first side, to discharge the paper sheet, to form an image on a paper sheet corresponding to the original size of the original for forming an image on the second side on the basis of image data of the original for forming the image on the second side, and to discharge this paper sheet.

According to this invention, there is also provided an image forming method comprising: a first step of forming a print order table in a memory when an automatic paper selector mode has been set and an instruction has been made to read a plurality of originals with different original sizes and form read images on first and second sides of a paper sheet; a second step of confirming whether original size data of an original for forming an image on the first side of the paper sheet and original size data of an original for forming an image on the second side have been stored on the print order table; a third step of selecting, when each of the data has been stored in the second step, a sheet feed source of a paper sheet corresponding to the original size of the original for forming an image on the second side from a plurality of sheet feed cassettes on which paper sheets of different sizes are set in advance; a fourth step of comparing the sizes of both originals on the basis of the original size data of the original for forming an image on the first side of the paper sheet and original size data of the original for forming an image on the second side which are stored on the print order table; a fifth step of determining a discharge destination of the paper sheet with the second side, on which the image is formed, to be a finisher, where both sizes are different in the fourth step; a sixth step of selecting a feed source of the paper sheet corresponding to the original size of the original for forming the image on the first side from the plurality of sheet feed cassettes; and a seventh step of determining a discharge destination of the paper sheet selected in the sixth step, on which the image is formed, to be the finisher.

DETAILED DESCRIPTION OF THE INVENTION

An embodiment of the present invention will now be described with reference to the accompanying drawings.

Figure 1:
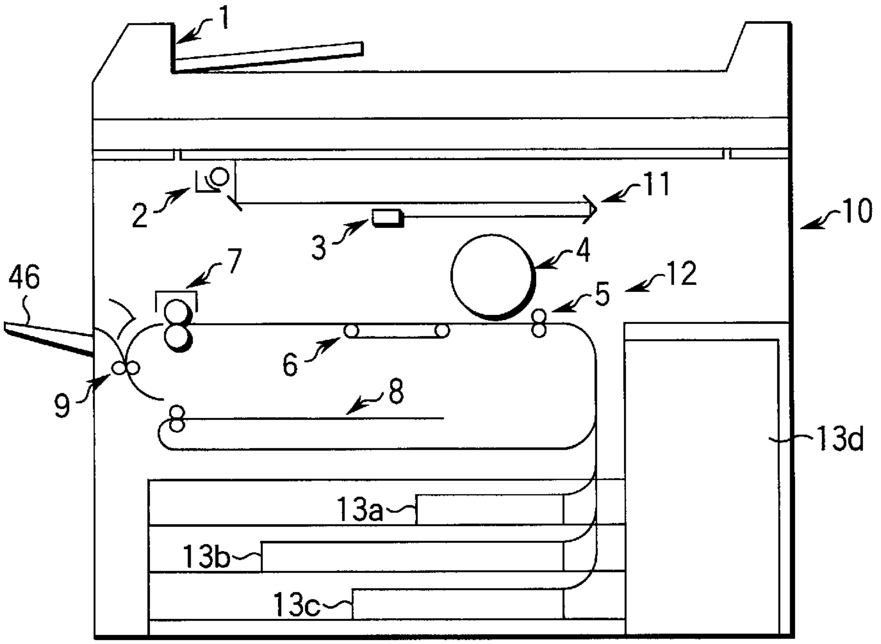
FIG. 1 is a cross-sectional view showing a schematic cross-sectional structure of an image forming apparatus according to the present invention.

FIG. 1 shows a schematic cross-sectional structure of an image forming apparatus according to the present invention. Specifically, this image forming apparatus 10 comprises a scanner 11 and a printer 12, and an automatic document feeder (ADF) 1 is mounted on an upper part thereof.

The scanner unit 11 serving as reading means includes a read light source (lamp) 2 as a light source, and a CCD sensor 3 for receiving reflection light from an original. The scanner unit 11 comprises a driving system (not shown) for varying positions of the respective elements including the light source 2.

In the printer unit 12 serving as image forming means, for example, a laser optical system is combined with an electrophotographic system capable of forming an image on transfer paper. Specifically, the printer 12 has a photosensitive drum 4 functioning as an image carrying body rotatably supported at a substantially central region within the apparatus. The printer 12 comprises register rollers 5, a transfer belt 6, a fixing device 7, an automatic double-side unit (ADU) 8, a reversing unit 9, etc.

Sheet feed cassettes 13*a*, 13*b*, 13*c* serving as sheet feed means are vertically stacked so as to be removable from a front side of the image forming apparatus 10. Copying paper sheets are stored in the sheet feed cassettes 13*a*, 13*b*, 13*c*. The copying paper sheets stored in the sheet feed cassettes 13*a*, 13*b*, 13*c* are picked up from an uppermost one by pickup rollers (not shown) and taken out.

A large-capacity sheet feeder (LCF) 13*d* is provided on a right side of the image forming apparatus 10. Copying paper sheets stored in the large-capacity sheet feeder 13*d* are picked up and taken out from an uppermost one by pickup rollers (not shown). A copying paper sheet fed to a take-out end side of the large-capacity sheet feeder 13*d* is conveyed toward the printer 12.

A finisher (FINISHER) 46 for discharging a paper sheet on which an image has been formed in the printer unit 12 is provided on a left side of the image forming apparatus 10.

Figure 2:
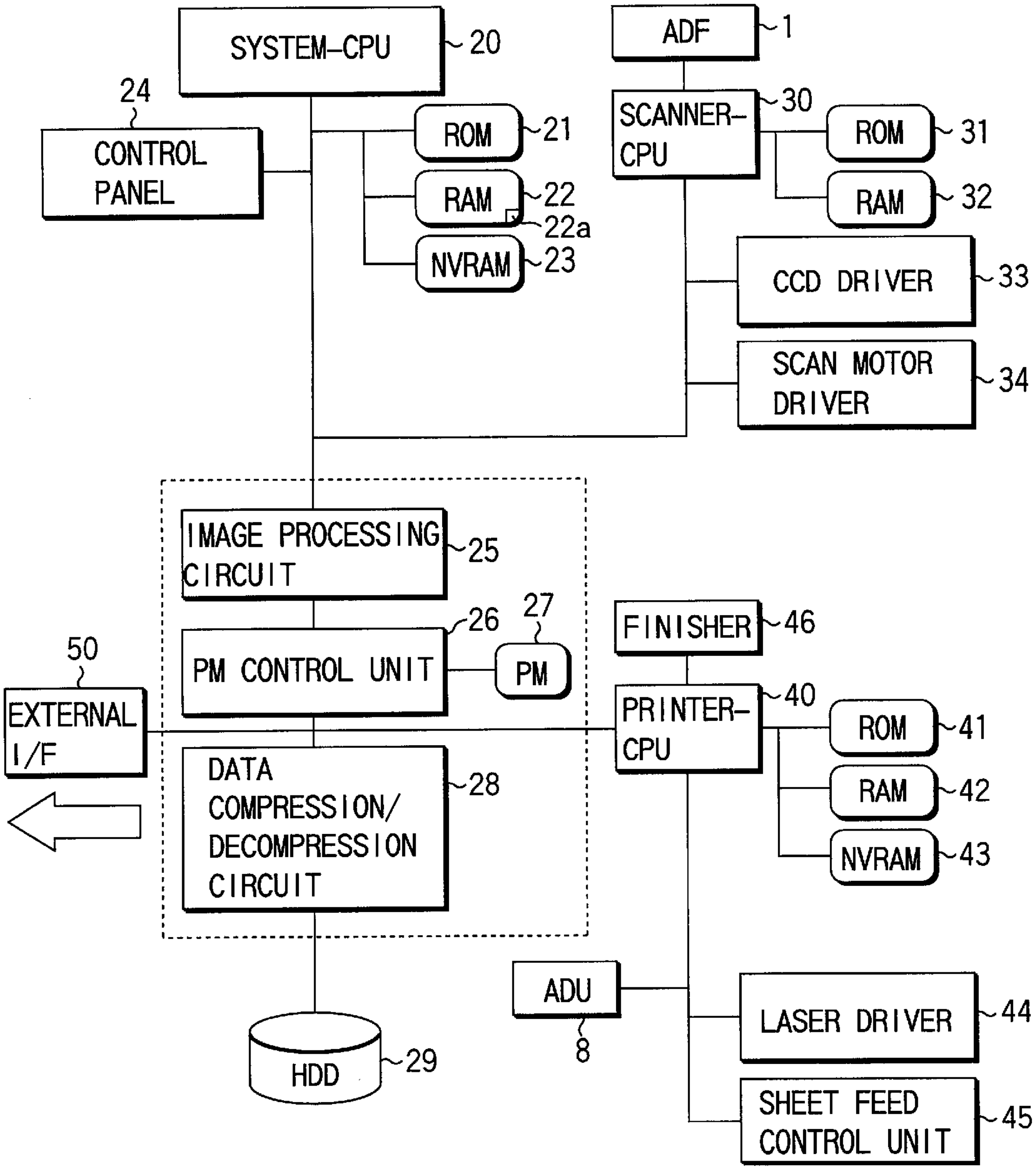
FIG. 2 is a block diagram schematically illustrating electrical connection in the image forming apparatus and a flow of signals for control.

FIG. 2 is a block diagram schematically illustrating electrical connection in the image forming apparatus 10 and a flow of signals for control. The image forming apparatus 10 comprises three CPUs, i.e. a system CPU (SYSTEM-CPU) 20, a scanner CPU (SCANNER-CPU) 30 of the scanner unit 11, and a printer CPU (PRINTER-CPU) 40 of the printer unit 12.

The system CPU 20 effects turning-on of LEDs/display of character sequences on a liquid crystal display (LCD) through operations on a control panel 24, a functional control according to operations, and instructions to the scanner CPU 30 and printer CPU 40.

The system CPU 20 receives state data from the scanner CPU 30 and printer CPU 40 by serial communication and displays it. The scanner CPU 30 and printer CPU 40 control respective driving devices in accordance with instructions from the system CPU 20.

The system CPU 20 is connected to a ROM 21, a RAM 22, an NVRAM 23, control panel 24, an image processing circuit 25, a page memory control unit (PM control unit) 26, a page memory (PM) 27, a data compression/circuit 28, and a hard disk drive (HDD) 29. The system CPU 20 has an external interface (external I/F) 50 for connection with an external apparatus.

Although described later in greater detail, a print-order table 22*a* for double-side printing is created in the RAM 22 by the system CPU 20.

The system CPU 20 controls the entirety of the apparatus. The ROM 21 stores control programs. The RAM 22 temporarily stores data. The NVRAM (nonvolatile RAM) 23 is a nonvolatile memory backed up by a battery (not shown). When power is turned off, data on the NVRAM 23 is kept.

The image processing circuit 25 performs an image process for image data. The page memory control unit 26 stores and reads out image data in and out of the page memory 27. The page memory 27 has areas capable of storing image data on a plurality of pages and can store compressed data of image data in units of a page. The data compression/decompression circuit 28 compresses image data and expands compressed image data. The hard disk drive 29 stores various data as storage means.

The scanner CPU 30 is connected to a ROM 31 storing control programs, etc., a RAM 32 for storing data, a CCD driver 33 for driving the CCD sensor 3, a scan motor driver 33 for controlling the rotation of a motor which moves the read light source 2, etc., and automatic document feeder (ADF) 1.

The printer CPU 40 is connected to a ROM 41 storing control programs, etc., a RAM 42 for storing data, an NVRAM 43 which is a nonvolatile memory, a laser driver 44 for turning on/off light emission from a semiconductor laser (not shown), a sheet feed control unit 45 for controlling feeding of paper sheets, finisher (FINISHER) 46 for discharging paper sheets on which images have been formed, and automatic double-side unit (ADU) 8.

Figure 3:
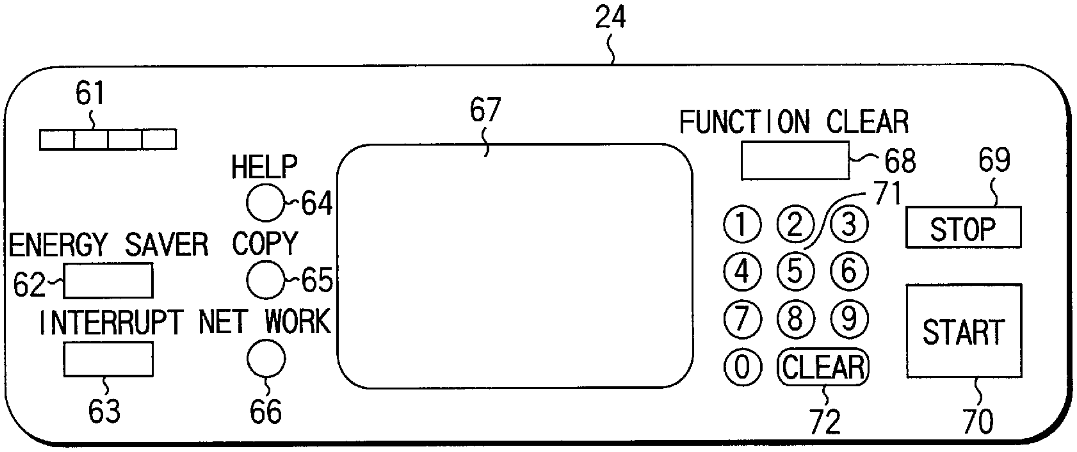
FIG. 3 shows a structure of a control panel.

FIG. 3 shows a structure of the control panel 24 serving as operating means. Specifically, the control panel 24 comprises a total counter 61, an energy saver (ENREGY SAVER) key 62, an interrupt (INTERRUPT) key 63, a help key 64, a copy key 65, a network (NETWORK) key 66, a message display device 67 constituted by a liquid crystal display (LCD) and a touch panel, a function clear (FUNCTION CLEAR) key 68, a stop key 69, a start key 70, ten-keys 71, and a clear key 72.

The message display device 67 displays in characters and pictures the states of the image forming apparatus, procedures of operations and various instructions for users. The message display device 67 serving as display means includes the touch panel for setting functions.

The stop key 69 is used to stop the copying operation.

The start key 70 is depressed to start copying.

The ten-keys 71 are used to set a desired number of copies.

The clear key 72 is used to correct the number of copies.

Prior to describing the control operations of the present invention, a description will first be given of the order of originals and print results in the case of performing the multiple-size double-side printing in the APS mode in the prior-art controls. Thus, problems are confirmed.

Figure 4A:
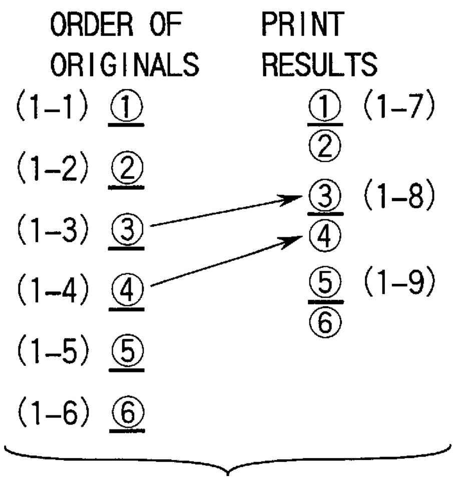
FIGS. 4A to 4C show an example of multiple-size double-side printing in a case where omission of image occurs.
Figure 4B:
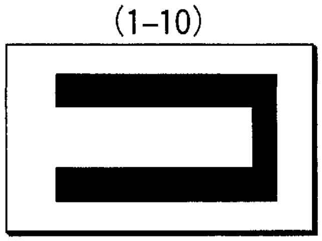
Figure 4C:
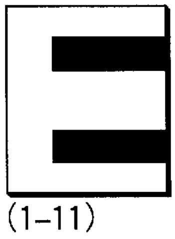

FIGS. 4A to 4C show an example of multiple-size double-side printing in a case where omission of image occurs. In this example, the sheet size for the second side is smaller than that for the first side. For example, if an image on an A3-size original is printed on an A4-size sheet, omission of image will occur.

In the figure, originals are arranged in the order of ①, ②, ③, ④, ⑤ and ⑥. Step (1-1) is associated with original ① of A4 size. Step (1-2) is associated with original ② of A4 size. Step (1-3) is associated with original ③ of A3 size. Step (1-4) is associated with original ④ of A4 size. Step (1-5) is associated with original ⑤ of A4 size. Step (1-6) is associated with original ⑥ of A4 size.

In step (1-7), the A4-size original ② associated with step (1-2) is first read and a read image is printed on a second side of a paper sheet. The paper sheet is then stacked on the automatic double-side unit. Subsequently, the A4-size original ① associated with step (1-1) is read and a read image is printed on a first side of the paper sheet stacked on the automatic double-side unit. The paper sheet is then discharged.

In subsequent step (1-8), the A4-size original ④ associated with step (1-4) is read and a read image is printed on a second side of a paper sheet. The paper sheet is then stacked on the automatic double-side unit. Subsequently, the A3-size original ③ associated with step (1-3) is read and a read image is printed on a first side of the paper sheet stacked on the automatic double-side unit. The paper sheet is then discharged.

In this case, as shown in FIG. 4B, the original ③ is of A3-size, whereas the paper sheet stacked on the automatic double-side unit, on the second side of which the image was printed, is of A4 size. Consequently, as shown in FIG. 4C, omission of image occurs on the print result on the first side.

In a subsequent step (1-9), the A4-size original ⑥ associated with step (1-6) is read and a read image is printed on a second side of a paper sheet. The paper sheet is then stacked on the automatic double-side unit. Following this, the A4-size original ⑤ associated with step (1-5) is read and a read image is printed on a first side of the paper sheet stacked on the automatic double-side unit. The paper sheet is then discharged.

Figure 5A:
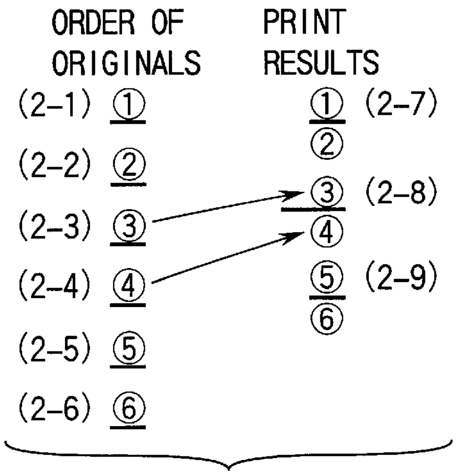
FIGS. 5A to 5C show an example of multiple-size double-side printing in a case where a blank portion forms.
Figure 5B:
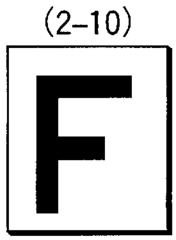
Figure 5C:
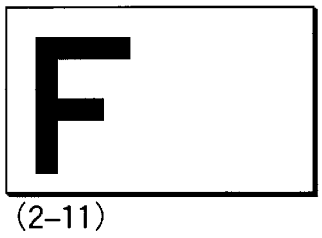

FIGS. 5A to 5C show an example of multiple-size double-side printing in a case where a blank portion forms. In this example, the sheet size for the second side is greater than that for the first side. For example, if an image on an A4-size original is printed on an A3-size paper sheet, half the paper sheet becomes blank.

In the figure, originals are arranged in the order of ①, ②, ③, ④, ⑤ and ⑥. Step (2-1) is associated with original ① of A4 size. Step (2-2) is associated with original ② of A4 size. Step (2-3) is associated with original ③ of A4 size. Step (2-4) is associated with original ④ of A3 size. Step (2-5) is associated with original ⑤ of A4 size. Step (2-6) is associated with original ⑥ of A4 size.

In step (2-7), the A4-size original ② associated with step (2-2) is first read and a read image is printed on a second side of a paper sheet. The paper sheet is then stacked on the automatic double-side unit. Subsequently, the A4-size original ① associated with step (2-1) is read and a read image is printed on a first side of the paper sheet stacked on the automatic double-side unit. The paper sheet is then discharged.

In subsequent step (2-8), the A3-size original ④ associated with step (2-4) is read and a read image is printed on a second side of a paper sheet. The paper sheet is then stacked on the automatic double-side unit. Subsequently, the A4-size original ③ associated with step (2-3) is read and a read image is printed on a first side of the paper sheet stacked on the automatic double-side unit. The paper sheet is then discharged.

In this case, as shown in FIG. 5B, the original ① is of A4-size, whereas the paper sheet stacked on the automatic double-side unit, on the second side of which the image was printed, is of A3 size. Consequently, as shown in FIG. 5C, a blank portion forms as a print result on the first side.

In a subsequent step (2-9), the A4-size original ⑥ associated with step (2-6) is read and a read image is printed on a second side of a paper sheet. The paper sheet is then stacked on the automatic double-side unit. Following this, the A4-size original ⑤ associated with step (2-5) is read and a read image is printed on a first side of the paper sheet stacked on the automatic double-side unit. The paper sheet is then discharged.

Next, a description will be given of the order of originals and print results in the case of performing the multiple-size double-side printing in the APS mode according to a first embodiment wherein the present invention is applied. The control operations in the first embodiment are executed by the system CPU 20.

Figure 6:
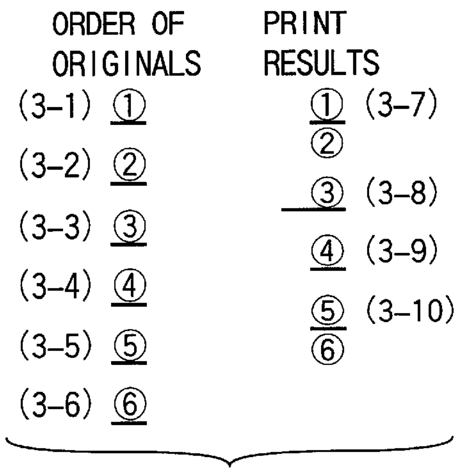
FIG. 6 is a view for describing a case where the sheet size for the second side is smaller than that for the first side.

FIG. 6 is a view for describing a case where the sheet size for the second side is smaller than that for the first side. Specifically, in the first embodiment, where the original sizes for the first and second sides are different, single-side printing is effected and printed sheets are discharged.

In the figure, originals are arranged in the order of ①, ②, ③, ④, ⑤ and ⑥. Step (3-1) is associated with original ① of A4 size. Step (3-2) is associated with original ② of A4 size. Step (3-3) is associated with original ③ of A3 size. Step (3-4) is associated with original ④ of A4 size. Step (3-5) is associated with original ⑤ of A4 size. Step (3-6) is associated with original ⑥ of A4 size.

In step (3-7), the A4-size original ② associated with step (3-2) is first read and a read image is printed on a second side of a paper sheet. The paper sheet is then stacked on the automatic double-side unit 8. Subsequently, the A4-size original ① associated with step (3-1) is read and a read image is printed on a first side of the paper sheet stacked on the automatic double-side unit 8. The paper sheet is then discharged.

In following step (3-8), the size of the original ④ associated with step (3-4) which corresponds to the second side of the sheet differs from the size of the original ③ associated with step (3-3) which corresponds to the first side of the sheet. Thus, single-side printing is effected and sheets are discharged. Specifically, the image on the A3-size original ③ associated with step (3-3) is read and printed on a paper sheet (A3 size) and the sheet is discharged (single-side printing).

In subsequent step (3-9), the A4-size original ④ associated with step (3-4) is read and printed on a paper sheet (A4-size) and the sheet is discharged (single-side printing).

In subsequent (3-10), the A4-size original ⑥ associated with step (3-6) is read and a read image is printed on a second side of a paper sheet. The paper sheet is then stacked on the automatic double-side unit 8. Subsequently, the A4-size original ⑤ associated with step (3-5) is read and a read image is printed on a first side of the paper sheet stacked on the automatic double-side unit 8. The paper sheet is then discharged.

Figure 7:
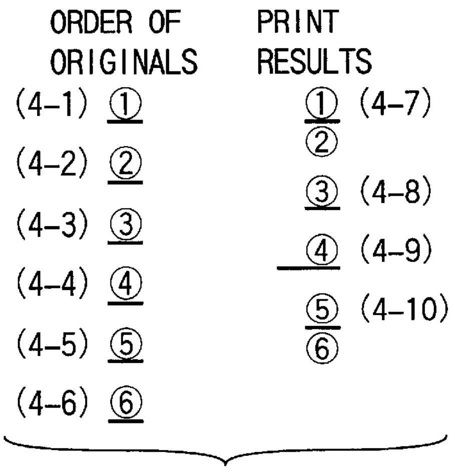
FIG. 7 is a view for describing a case where the sheet size for the second side is greater than that for the first side.

FIG. 7 is a view for describing a case where the sheet size for the second side is greater than that for the first side. Where the original sizes for the first and second sides are different, single-side printing is effected and printed sheets are discharged.

In the figure, originals are arranged in the order of ①, ②, ③, ④, ⑤ and ⑥. Step (4-1) is associated with original ① of A4 size. Step (4-2) is associated with original ② of A4 size. Step (4-3) is associated with original ③ of A4 size. Step (4-4) is associated with original ④ of A3 size. Step (4-5) is associated with original ⑤ of A4 size. Step (4-6) is associated with original ⑥ of A4 size.

In step (4-7), the A4-size original ② associated with step (4-2) is first read and a read image is printed on a second side of a paper sheet. The paper sheet is then stacked on the automatic double-side unit 8. Subsequently, the A4-size original ① associated with step (4-1) is read and a read image is printed on a first side of the paper sheet stacked on the automatic double-side unit 8. The paper sheet is then discharged.

In following step (4-8), the size of the original ④ associated with step (4-4) which corresponds to the second side of the sheet differs from the size of the original ③ associated with step (4-3) which corresponds to the first side of the sheet. Thus, single-side printing is effected and sheets are discharged. Specifically, the image on the A3-size original ③ associated with step (4-3) is read and printed on a paper sheet (A4 size) and the sheet is discharged (single-side printing).

In subsequent step (4-9), the A4-size original ④ associated with step (4-4) is read and printed on a paper sheet (A3-size) and the sheet is discharged (single-side printing).

In subsequent (4-10), the A4-size original ⑥ associated with step (4-6) is read and a read image is printed on a second side of a paper sheet. The paper sheet is then stacked on the automatic double-side unit 8. Subsequently, the A4-size original ⑤ associated with step (4-5) is read and a read image is printed on a first side of the paper sheet stacked on the automatic double-side unit 8. The paper sheet is then discharged.

As has been described above, according to the first embodiment, printing can be effected in the print order corresponding to the order of originals. It is thus possible to prevent omission of image from occurring where A3 image data is printed on the A4 sheet, or a blank portion from forming on a half area of a sheet where A4 image data is printed on an A3 sheet.

Figure 8:
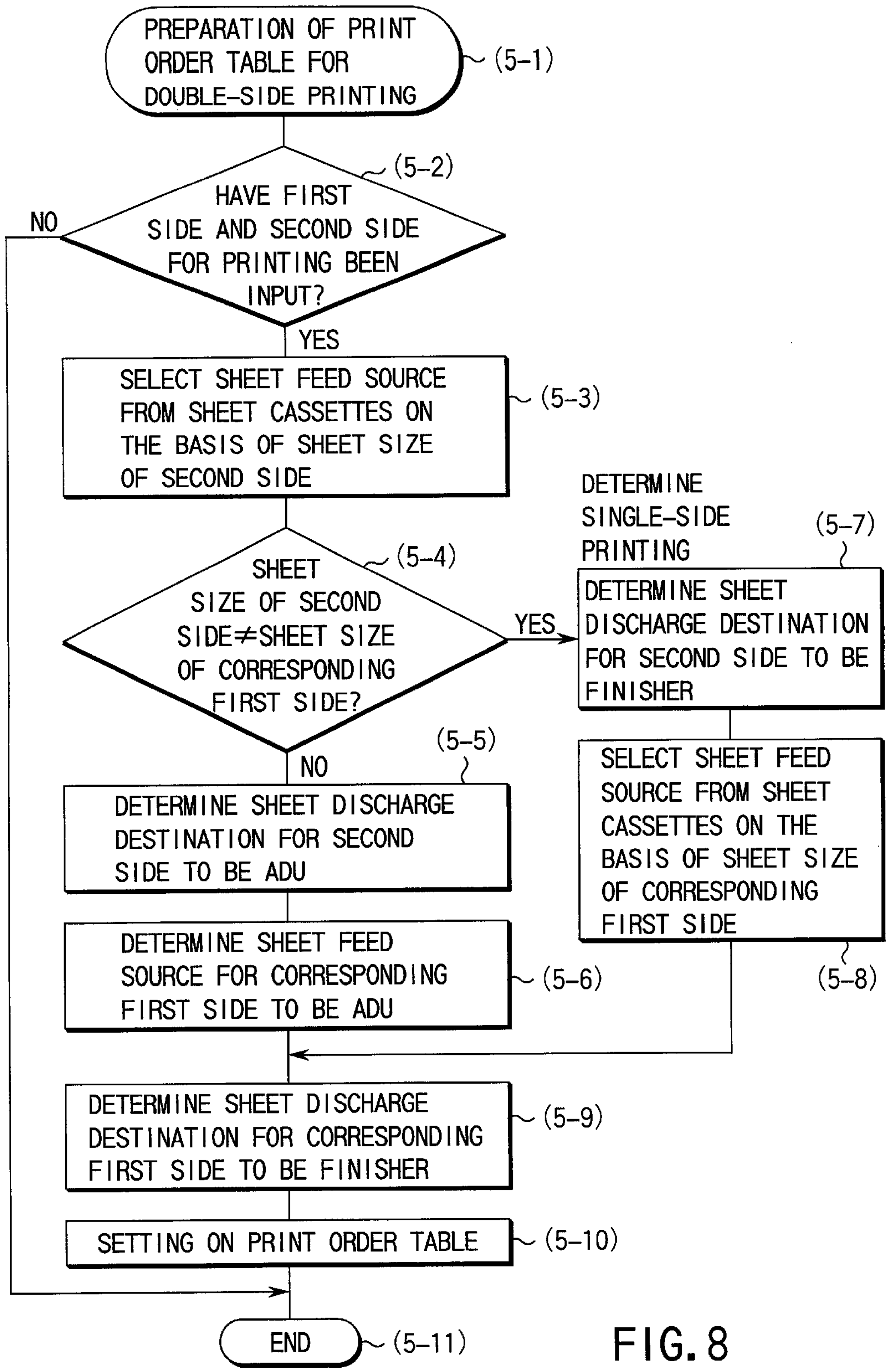
FIG. 8 is a flow chart illustrating decision of operations in the multiple-size double-side printing in an APS mode using a printer order table.

A second embodiment will now be described with reference to a flow chart of FIG. 8 illustrating decision of operations in the multiple-size double-side printing in an APS mode using a printer order table 22*a*.

The system CPU 20 starts preparation of the print order table by storing on the print order table 22*a* print data on, e.g. the image size of image data scanned by the scanner unit 11 (5-1), and confirms whether print data on first and second sides is input (5-2).

If the print data on the first and second sides is not input in step (5-2), the system CPU 20 finishes the process (5-11). If the print data is input, the system CPU 20 executes the printing.

The system CPU 20 selects a sheet feed source for the second side from the sheet feed cassettes 13*a*, 13*b* and 13*c* and large-capacity sheet feeder 13*d*, by referring to the print order table 22*a* (5-3).

The system CPU 20 compares the sheet sizes of the first and second sides with reference to the print order table 22*a* (5-4). If the sheet sizes are equal, control advances to step (5-5). If the sheet sizes are different, control goes to step (5-7).

In step (5-5), the system CPU 20 determines that the sheet whose second side has been printed is stacked on the automatic double-side unit 8, and determines the sheet feed source for the corresponding first side to be the automatic double-side unit 8 (5-6).

In step (5-7), the system CPU 20 initiates single-side printing and determines the sheet feed destination of the sheet whose second side has been printed to be the finisher 46. The system CPU 20 selects the sheet feed source from the sheet feed cassettes 13*a*, 13*b* and 13*c* and large-capacity sheet feeder 13*d*, on the basis of the sheet size of the corresponding first side of the original (5-8).

The system CPU 20 determines the sheet discharge destination for the first side in step (5-6) or (5-8) to be the finisher 46 (5-9) and sets the data on the print order table 22*a*.

As has been described above, according to the second embodiment, even if the sheet sizes for the first and second sides are different, single-side printing can be effected for different sizes by using the print order table 22*a*. Thus, productivity can be enhanced.

Figure 9:
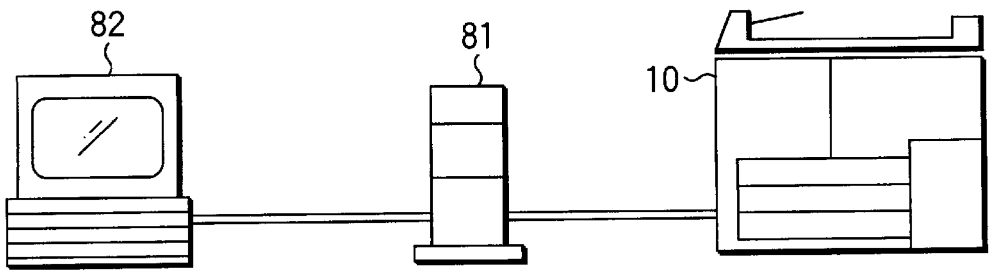
FIG. 9 shows an example wherein an external apparatus is connected to the image forming apparatus 10.

FIG. 9 shows an example wherein an external apparatus is connected to the image forming apparatus 10. Specifically, a client 82 comprising a personal computer, etc. is connected to the image forming apparatus 10 via the external interface 50 and a controller 81.

Where the image forming apparatus 10 is used as a printer, image information to be printed is produced and sent, for example, by means of application software on the connected client 82. Even where such application software is used to produce a document, there is a case where data of different sizes, e.g. A4-size data and A3-size data, is included in the document (electronic multiple-size data). In the case of such electronic multiple-size data, the present invention can be applied to prevent omission of image in the double-side mode.

What is claimed is:

1. An image forming apparatus comprising:

confirmation means for confirming, when an instruction has been made to read a plurality of originals with different original sizes and form read images on first and second sides of a paper sheet, whether or not the original sizes of the originals whose images are to be formed on the first and second sides of the paper sheet are the same;

first control means for performing, when the original sizes are determined to be the same by the confirmation means, a control to form an image on a paper sheet corresponding to the original size of the original for forming an image on the second side on the basis of image data of the original for forming the image on the second side, to form an image on an image formation surface of the paper sheet on the basis of image data of the original for forming an image on the first side, and to discharge the paper sheet; and second control means for performing, when the original sizes are determined to be different by the confirmation means, a control to form an image on a paper sheet corresponding to the original size of the original for forming an image on the first side on the basis of image data of the original for forming the image on the first side, to discharge the paper sheet, to form an image on a paper sheet corresponding to the original size of the original for forming an image on the second side on the basis of image data of the original for forming the image on the second side, and to discharge this paper sheet.

2. An image forming apparatus according to claim 1, wherein said confirmation means makes confirmation when an automatic paper selector mode is set.

3. An image forming apparatus according to claim 1, wherein said confirmation means makes confirmation when at least data on the original size of the original for forming the image on the first side of the paper sheet and data on the original size of the original for forming the image on the second side are stored on a print order table provided in a memory.

4. An image forming apparatus according to claim 1, wherein said second control means, when the confirmation means has confirmed that the original sizes of the originals for forming the images on the first and second sides of the paper sheet are different, a control to form an image only on one side of the paper sheet, despite the instruction being made to form images on both the first and second sides of the paper sheet.

5. An image forming apparatus according to claim 1, wherein said second control means performs a control to select a paper sheet corresponding to the original size from a plurality of sheet feed cassettes on which paper sheets of different sizes are set in advance, and to feed the paper sheet corresponding to the original size.

6. An image forming method comprising:

a first step of confirming, when an instruction has been made to read a plurality of originals with different original sizes and form read images on first and second sides of a paper sheet, whether or not the original sizes of the originals whose images are to be formed on the first and second sides of the paper sheet are the same;

a second step of performing, when the original sizes are determined to be the same in said first step, a control to form an image on a paper sheet corresponding to the original size of the original for forming an image on the second side on the basis of image data of the original for forming the image on the second side, to form an image on an image formation surface of the paper sheet on the basis of image data of the original for forming an image on the first side, and to discharge the paper sheet; and a third step of performing, when the original sizes are determined to be different in said first step, a control to form an image on a paper sheet corresponding to the original size of the original for forming an image on the first side on the basis of image data of the original for forming the image on the first side, to discharge the paper sheet, to form an image on a paper sheet corresponding to the original size of the original for forming an image on the second side on the basis of image data of the original for forming the image on the second side, and to discharge this paper sheet.

7. An image forming method according to claim 6, wherein said third step performs a control to form each of image data of the original for forming an image on the first side and image data of the original for forming an image on the second side on only one side of the paper sheet with the size corresponding to each of said image data, and to discharge the paper sheet.

8. An image forming method comprising:

a first step of forming a print order table in a memory when an automatic paper selector mode has been set and an instruction has been made to read a plurality of originals with different original sizes and form read images on first and second sides of a paper sheet;

a second step of confirming whether original size data of an original for forming an image on the first side of the paper sheet and original size data of an original for forming an image on the second side have been stored on the print order table;

a third step of selecting, when each of the data has been stored in said second step, a sheet feed source of a paper sheet corresponding to the original size of the original for forming an image on the second side from a plurality of sheet feed cassettes on which paper sheets of different sizes are set in advance;

a fourth step of comparing the sizes of both originals on the basis of the original size data of the original for forming an image on the first side of the paper sheet and original size data of the original for forming an image on the second side which are stored on the print order table;

a fifth step of determining a discharge destination of the paper sheet with the second side, on which the image is formed, to be a finisher, where both sizes are different in said fourth step;

a sixth step of selecting a feed source of the paper sheet corresponding to the original size of the original for forming the image on the first side from said plurality of sheet feed cassettes; and a seventh step of determining a discharge destination of the paper sheet selected in said sixth step, on which the image is formed, to be the finisher.

9. An image forming method comprising:

determining, if an instruction has been made to read a plurality of originals with different original sizes and form read images on first and second sides of a paper sheet, whether or not the original sizes of the originals whose images are to be formed on the first and second sides of the paper sheet are the same;

controlling image formation, if the original size of the original for forming an image on the second side on the basis of image data of the original for forming the image on the second side, to form an image on an image formation surface of the paper sheet on the basis of image data of the original for forming an image on the first side, and to discharge the paper sheet; and controlling image formation, if the original sizes are not the same, to form an image on a paper sheet corresponding to the original size of the original for forming an image on the first side on the basis of image data of the original for forming the image on the first side, to discharge the paper sheet, to form an image on a paper sheet corresponding to the original size of the original for forming an image on the second side, and to discharge the paper sheet.

10. An image forming method according to claim 9, further comprising controlling image formation, if the original sizes are different, to form each other image data of the original for forming an image on the first side and image data of the original for forming an image on the second side on only one side of the paper sheet with the size corresponding to each of said image data, and to discharge the paper sheet.

11. An image forming apparatus, comprising:

a control unit configured to, if instructed to form respective images of a plurality of originals on first and second sides of a paper sheet:

if the sizes of first and second originals of said plurality of originals are the same, control forming an image on a second side of a first paper sheet having a size corresponding to the original size of the second original based on image data of the second original, control forming an image on a first side of the first paper sheet based on image data of the first original, and discharge the first paper sheet; and if the sizes of the first and second originals are different, control forming an image on a first side of the first paper sheet having a size corresponding to the original size of the first original based on the image data of the first original, discharge the first paper sheet, control forming an image on a first side of a second paper sheet corresponding to the original size of the second original based on the image data of the second original, and discharge the second paper sheet.

12. An image forming apparatus according to claim 11, wherein the control unit is further configured to determine if the first and second originals are the same size, wherein the control unit controls forming the images of the first and second originals in accordance with the determination.

13. An image forming apparatus according to claim 12, wherein the control unit is configured to determine if the first and second originals are the same size when the image forming apparatus is set to an automatic paper select mode.

14. An image forming apparatus according to claim 11, wherein the control unit controls forming the image data of the first and second originals on only one side of the first and second paper sheets, respectively, if the sizes of the first and second originals are different regardless of an instruction to form the images or the first and second originals on first and second sides of a single paper sheet.

15. An image forming apparatus according to claim 11, wherein the image data of the plurality of originals is received from a computer coupled to the image forming apparatus.

16. An image forming apparatus according to claim 11, wherein the control unit is further configured to prepare a print order table, the print order table storing print data related to the sizes of the first and second originals.

17. An image forming apparatus according to claim 16, wherein the control unit is further configured to determine if the print order table contains print data related to the first and second originals; and if the control unit determines that the print order table contains print data related to the first and second originals, the control unit is configured to determine if the first and second originals are the same size using the print data stored in the print order table.

18. An image forming apparatus according to claim 16, wherein the control unit is further configured to:

determine if the print data relating to the first and second originals has been stored in the print order table; and select a size of the first paper sheet based on the print data relating to the sizes of the first and second originals.

19. An image forming apparatus according to claim 18, wherein the control unit is further configured to:

provide the first paper sheet to an automatic double-side unit after forming the image on the second side of the first paper sheet based on the image data of the second original if the sizes of the first and second originals are the same; and discharge the first paper sheet to a finisher after forming the image on the first paper sheet based on the image data of the first original if the sizes of the first and second originals are different.

20. An image forming apparatus according to claim 16, wherein the control unit is further configured to:

determine if the print data relating to the first and second originals has been stored in the print order table; and select a size for the first paper sheet corresponding to the size of the second original according to the print order table if the first and second original sizes are the same; and select a size for the first paper sheet corresponding to the size of the first original according to the print order table if the first and second original sizes are different.

21. An image forming apparatus according to claim 9, wherein the control unit is further configured to:

set a destination for the first paper sheet with the formed image that is based on the second original to be an automatic double-side unit if the sizes of the first and second originals are the same, and set a destination for the second paper sheet with the formed image that is based on the second original to be a finisher if the sizes of the first and second originals are different.

22. An image forming apparatus of claim 21, wherein the image forming apparatus further comprises a scanner that scans the plurality of originals; and a printer that prints the images on the paper sheets based on the control from the control unit.

23. A method for forming images of a plurality of originals on first and second sides of a paper sheet in an image forming apparatus, comprising:

receiving an instruction to form images of a plurality of originals on first and second sides of a paper sheet;

forming, if the sizes of first and second originals of said plurality of originals are the same, an image on a second side of a first paper sheet having a size corresponding to an original size of the second original based on image data of the second original, forming an image on a first side of the first paper sheet based on image data of the first original, and discharging the first paper sheet; and forming, if the sizes of the first and second originals are different, an image on a first side of the first paper sheet having a size corresponding to the original size of the first original based on the image data of the first original, discharging the first paper sheet, forming an image on a first side of a second paper sheet corresponding to the original size of the second original based on the image data of the second original, and discharging the second paper sheet.

24. A method according to claim 23, further comprising determining if the first and second originals are the same size, wherein the images of the first and second originals are formed in accordance with the determination.

25. A method according to claim 24, further comprising determining if the first and second originals are the same size when the image forming apparatus is set to an automatic paper select mode.

26. A method according to claim 23, further comprising forming the image data of the first and second originals on only one side of the first and second paper sheets, respectively, if the sizes of the first and second originals are different regardless of an instruction to form the images of the first and second originals on first and second sides of a single paper sheet.

27. A method according to claim 23, wherein the image data of the plurality of originals is received from a computer coupled to the image forming apparatus.

28. A method according to claim 23, further comprising preparing a print order table, the print order table storing print data related to the sizes of the first and second originals.

29. A method according to claim 29, further comprising:

determining if the print order table contains print data related to the first and second originals; and determining if the first and second originals are the same size using the print data stored in the print order table if the print order table contains print data related to the first and second originals.

30. A method according to claim 28, further comprising:

determining if the print data relating to the first and second originals has been stored in the print order table; and selecting a size of the first paper sheet based on the print data relating to the sizes of the first and second originals.

31. A method according to claim 30, further comprising:

providing the first paper sheet to an automatic double-side unit after forming the image on the second side of the first paper sheet based on the image data of the second original if the sizes of the first and second originals are the same; and discharging the first paper sheet to a finisher after forming the image on the first paper sheet based on the image data of the first original if the sizes of the first and second originals are different.

32. A method according to claim 28, further comprising:

determining if the print data relating to the first and second originals has been stored in the print order table; and selecting a size for the first paper sheet corresponding to the size of the second original according to the print order table if the first and second original sizes are the same; and selecting a size for the first paper sheet corresponding to the size of the first original according to the print order table if the first and second original sizes are different.

33. A image forming apparatus, comprising:

an input unit that obtains image data of a plurality of originals including a first original and a second original; and a central processing unit that controls forming images using the image data, wherein, if an instruction is received to form the images of the first and second originals on a first side and a second side of a paper sheet, respectively, the central processing unit is configured to:

control, if the first and second originals are the same size, forming images corresponding to the first and second originals on first and second sides of a first paper sheet, respectively, and control, if the first and second originals are different sizes, forming an image corresponding to the first original on a first paper sheet and forming an image corresponding to the second original on a second paper sheet.

34. An image forming apparatus according to claim 33, wherein the plurality of originals further includes a third original and a fourth original, the first, second, third and fourth originals being part of a same job to be processed by the image forming apparatus, wherein, if an instruction is received to form the images of the third and fourth originals on a first side and a second side of a paper sheet, respectively, the central processing unit is configured to:

control, if the first and second originals are the same size and the third and fourth originals are the same size, forming images corresponding to the third and fourth originals on first and second sides of the second paper sheet, respectively, and control, if the first and second originals are different sizes and the third and fourth originals are different sizes, forming an image corresponding to the third original on a third paper sheet and forming an image corresponding to the fourth original on a fourth paper sheet.

35. An image forming apparatus according to claim 33, wherein the central processing unit is further configured to control, it the first and second originals are the same size, forming an image corresponding to the second original to the second side of the first paper sheet, providing the paper sheet to an automatic double-side unit, and then forming an image corresponding to the first original on the first side of the first paper sheet.

36. An image forming apparatus according to claim 35, wherein the central processing unit is further configured to control, if the first and second originals are different sizes, forming an image corresponding to the second original to the second paper sheet, and providing the second paper sheet to a finisher.

37. An image forming apparatus according to claim 36, wherein the input unit is configured to perform at least one of the following: (i) scan the plurality of originals to obtain the image data of the plurality of originals, and (ii) receive the image data from an image data source coupled to the image forming apparatus.

38. An image forming apparatus according to claim 37, further comprising a memory, wherein the memory stores a print order table containing print data related to the sizes of the first and second originals, and wherein the central processing unit is further configured to determine whether the first and second originals are the same size using the print data stored in the print order table.

39. An image forming apparatus according to claim 33, further comprising a memory, wherein the memory stores a print order table containing print data related to the sizes of the first and second originals, and wherein the central processing unit is further configured to determine whether the first and second originals are the same size using the print data stored in the print order table.

40. A method for forming images of a plurality of originals on first and second sides of a paper sheet in an image forming apparatus, comprising:

obtaining image data of a plurality of originals including a first original and a second original;

receiving an instruction to form the images of the first and second originals on a first side and a second side of a paper sheet, respectively;

forming images corresponding to the first and second originals on first and second sides of a first paper sheet, respectively, if the first and second originals are the same size; and forming an image corresponding to the first original on a first paper sheet and forming an image corresponding to the second original on a second paper sheet if the first and second originals are different sizes.

41. A method according to claim 40, wherein the plurality of originals further includes a third original and a fourth original, the first, second, third and fourth originals being part of a same job to be processed by the image forming apparatus, the method further comprising:

receiving an instruction to form the images of the third and fourth originals on a first side and a second side of a paper sheet, respectively;

forming images corresponding to the third and fourth originals on first and second sides of the second paper sheet, respectively, if the first and second originals are the same size and the third and fourth originals are the same size; and forming an image corresponding to the third original on a third paper sheet and forming an image corresponding to the fourth original on a fourth paper sheet if the first and second originals are different sizes and the third and fourth originals are different sizes.

42. A method according to claim 40, further comprising:

forming an image corresponding to the second original to the second side of the first paper sheet if the first and second originals are the same size;

providing the paper sheet to an automatic double-side unit; and then forming an image corresponding to the first original on the first side of the first paper sheet.

43. A method according to claim 40, wherein the image data is obtained by at least one of the following: (i) scanning the plurality of originals to obtain the image data of the plurality of originals, and (ii) receiving the image data from an image data source coupled to the image forming apparatus.

* * * * *